United States Patent Office 3,473,687
Patented Oct. 21, 1969

3,473,687
HERMETIC CAPSULE AND METHOD OF MANUFACTURE THEREOF
Bendt Wegge Larsen, Augustenborg, and Egon Lund, Sonderborg, Denmark, assignors to Danfoss A/S Nordborg, Denmark, a company of Denmark
Filed Nov. 13, 1967, Ser. No. 682,427
Claims priority, application Germany, Nov. 10, 1966, D 51,507
Int. Cl. B65d 7/38; B23k 33/00
U.S. Cl. 220—4  4 Claims

ABSTRACT OF THE DISCLOSURE

A hermetic capsule constructed by joining and hermetically sealing the joint of two shells or halves each having a circumferential flange. One of the shells is provided with an upstanding rim circumferentially of its flange so that when the flanges of the two shells are disposed in overlying relationship the rim tends to hold the halves from shifting relative to each other in a lateral direction in a plane along which the flanges overlie each other. A weld seam along the rim and the other flange seals the shells hermetically after the apparatus within the capsule has been positioned within the shells prior to assembly thereof.

Figure 1:
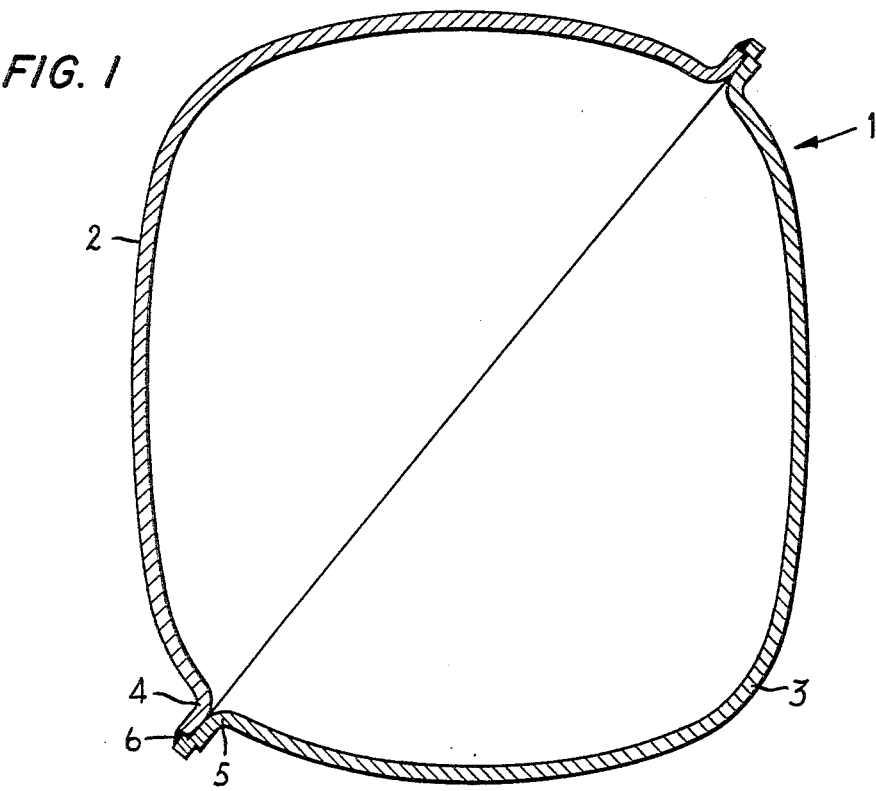

The shells are manufactured by drawing them as identical shells with circumferential flanges. One of the shells has its flanged trimmed, for example, by a punching operation. On the other shell the flange is not completely punched through instead the marginal edge portion that would normally be trimmed off is only "half-punched" and is formed into the upstanding rim about the flange.

---

This invention relates generally to housings or capsules and more particularly to hermetic capsules for refrigeration units water pumps and the like.

Capsules are known which have plane flanges circumferentially of the individual shells. The flanges are placed one upon another in an overlying relationship and are welded together at the outer periphery thereof in an assembled condition therefore forming a hermetic capsule after apparatus have been mounted internally of the shells. This kind of capsule construction has an advantage in that the welding can be accomplished by fully automatic equipment by using a circumferential seam welding machine. However, such capsule constructions have a disadvantage in that the weld is situated at the outer circumference without protection and that welded globules can penetrate into the interior of the shells if the flanges are not absolutely flat at the plane of jointure thereof.

Moreover this type of known capsule construction requires expensive jigs or fixtures to keep the shells in proper relationship relative to one another in an assembled condition during the welding. Slight lateral shifts within the plane of the overlying flanges are nevertheless unavoidable. This is particularly a problem if the housing or capsule is constructed from shells in which the plane in which the joining of the shells takes place is disposed diagonally of the assembled capsule shells. The apparatus housed within the shells has to be supported on both shells in some cases and, therefore, there is only very little space left around the built-in or enclosed machine or apparatus.

Capsules or housings are also known in which one of two substantially cylindrical shells has a cylindrically widened portion and engages the facing end of the other shell with this widened portion in the manner of a bushing. However, housings or capsules of this kind cannot be automatically welded on circumferential seam welding machines because there is no room for the application of the welding tools.

It is a principal object of the present invention to provide a hermetic capsule construction in which the capsule shells can be automatically welded on a circumferential seam welding machine and the new and improved shell construction avoids the difficulties experienced heretofore with flange capsules during manufacture thereof.

A feature of the invention is the provision of flanges circumferentially of the opening of the two shells to be assembled together. One flange is shorter than the other flange and the longer flange is longer by virtue of an upstanding rim which is disposed circumferentially of the shorter flange when the two shells are disposed with the flanges thereof in overlying relationship in an assembly set-up for being joined together by a seam weld.

Another feature of the invention is the provision of guiding surfaces on the aforementioned rim for guiding the welding apparatus or welding tool thereof in a radial direction or plane and about the circumferential end of the flange and for easily and accurately guiding it in a plane normal to the radial plane thereby accurately guiding the welding tool in two planes. The guide surfaces avoid the necessity of using templates, for guiding the welding tools, which are particularly necessary if a flange circumference deviates from a circular shape.

Another feature of the present invention is that the capsule has upstanding rim which need not be covered by the weld. The rim makes it possible to weld in effecting a seam in which weld gloubles cannot enter the interior of the capsule. The underside of the rim is likewise used as a reference surface in an axial direction control of the welding tool in the guidance above-described.

The upstanding rim of the one flange extends upwardly only a limited height and this height is less than the thickness of the shorter flange on the other shell so that the seam weld is effected on an upper surface of the rim and a circumferential or side surface of the other shorter flange.

An advantage of the construction of a capsule in accordance with the invention is that the manufacture of the up-ended or upstanding rim is greatly simplified in that the longer flange is worked on in a circumferential marginal portion and near the outer circumference to form the rim. The rim may be produced on the larger flange by partial punching rather than bending which results in a very accurate smooth guide surface being formed and in particular the transition from the upper flange surface to the inner surface of the rim is produced as a sharp edge so that accurate positioning and alignment of the other flange of the other shell is possible.

During manufacture the shells are formed, for example, by deep-drawing and the flanges are formed by a punching operation. The larger flange has the marginal portion only "half-punched" which takes place simultaneously with the through punching of the superfluous flange portion which would normally project radially outwardly beyond the desired circumference of the rim. The process then makes it possible to use, for example, two identical half-shells for a capsule which are both subjected to the same process steps except for the final punching operation forming the rim.

Figure 2:
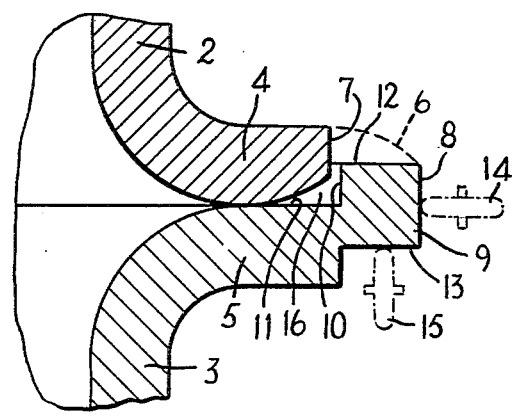

Other features and advantages of the capsule and method of construction thereof in accordance with the present invention will be better understood as described in the following specification and appended claims, in conjunction with the following drawings in which:

FIG. 1 is a longitudinal section view of a hermetic capsule, in accordance with the invention, without an apparatus therein, and FIG. 2 is a fragmentary section view of a detail on an enlarged scale showing the region of the seam of the two welded flanges illustrated in FIG. 1.

While the hermetic capsule later herein described is particularly applicable to hermetically encapsulating refrigerant compressors it will be understood that the capsule can be used to enclose hermetically other apparatus.

As illustrated in the drawing a capsule 1 comprises two shells or halves consisting of an upper shell 2 and a lower shell 3. The shells are provided with circumferential flanges 4, 5 respectively. These flanges are disposed circumferentially of the mouth or opening of the individual shells. While the shells are shown as the type that can be joined in a diagonal plane of the capsule it will be understood by those skilled in the art that the principles of the invention are equally applicable to shells in which the joining thereof is in a plane substantially horizontal.

The flange 4 is shorter in a radial direction than the flange 5 so that upon assembly in the relative positions illustrated the halves or shells are joined by a weld or seam 6 joining a circumferential edge or end surface 7 of the flange 4 and extending out to a circumferential surface 8 and welded to an upper surface of an upstanding or up-ended rim 9 on the flange 5 disposed circumferentially of the outer surface 7 of the flange 4.

It can readily be seen in FIG. 2 that the shells are assembled with the flanges 4, 5 overlying each other and the flange 4 is held in a circumferential or radial position relative to the flange 5 by the rim 9 which extends upwardly less than the thickness of the flange 4. The rim 9 prevents any lateral movement of the shells relative to each other and relative to a plane corresponding with a diagonal along which the shells are joined or particularly relative to a plane substantially corresponding and parallel to this diagonal.

The rim is formed as hereinafter described and has an accurate inner surface 10 accurately guiding and holding in proper position the circumferential surface 7 of the other flange 4 while the flange rests on an accurately substantially planar surface 11. The rim has an accurately formed upper planar surface 12 on which the weld seam is disposed and is formed with an under surface 13 which is highly accurately formed as later described. The circumferential surface 8 of the rim and the underside surface 13 will accurately guide feeler or sensing rolls 14, 15 respectively which are illustrated diagrammatically as guides for radial and axial guidance of a welding tool or apparatus, not shown, that welds the shells together.

The forming of the flanges may result in a gap 16, as shown in FIG. 2, being defined between the flange which nevertheless does not permit weld material globules from entering into the interior of the assembled capsule since this gap is labyrinth-like. The gap or space 16 will prevent entry of the globules even if the flanges 4, 5 should in some places not be in close contact with one another.

In making the shells they are formed, for example, by deep-drawing and having the flanges 4, 5 formed thereon. The flanges 4 and 5 may be made of equal radial length and the shells are substantially identical. The flange 4 is then mechanically punched or sheared to form quite accurate the circumferential flange surface 7. The other flange 5 on the shell 3 is only partially punched and is not completely punched through after it has been punched to form the surface 8 and an external shoulder between the marginal portion defining the rim 9 and the remainder of the flange. The flanges, and the shells, are of equal thickness. That is to say the flanges 4, 5 when first cut are of equal thickness and the half-punching operation for forming the upstanding rim 9 results in the flow of the metal in the circumferential marginal portion of the flange 5 into the position illustrated accurately forming the various rim surfaces heretofore described. The last punching operation on the flange 5 is effected only sufficiently to cause the rim 9 to have the height substantial as illustrated in FIG. 2 and less than the overall height or thickness of the other flange 4 so that the weld material of the seam 6 can be deposited in a protected circumferential channel as illustrated.

While a preferred embodiment of the invention has been shown and described it will be understood that many modifications and changes can be made within the true spirit and scope of the invention.

What we claim and desire to be secured by Letters Patent is:

1. A capsule for hermetically enclosing apparatus therein comprising, two substantially alike flanged shells joinable together along the flanges thereof in fixed assembly with each other defining said capsule, one of said shells having a radial flange circumferentially and a marginal portion circumferentially of said flange of the same thickness as the remainder of said flange displaced offset from a plane extending through said remainder of said flange to a second plane parallel with respect thereto, said marginal portion extending outwardly from said shell in a same general direction as said remainder of said flange with said second plane passing through said marginal portion being disposed parallel to the first-mentioned plane and said marginal portion having an inner surface defining an upstanding rim circumferentially of said remainder of said flange, said remainder of said flange having a circumferential surface defining an external shoulder in conjunction with said marginal portion. the other of said shells having a radial circumferential flange positionable overlying the remainder of said flange of said one shell in assembly of said two shells into a capsule, in said assembly of said two shells said rim extending circumferentially of a circumferential peripheral edge surface said flange of said other shell, and a weld deposited on said marginal portion joining said marginal portion and said circumferential edge surface of said other of said shells.

2. A capsule according to claim 1, in which said rim has a height less than the thickness of said one flange, said rim having an upper surface and said one flange having a circumferential surface, and in assembled condition of said shells said weld being deposited on said upper surface welding said upper surface to said circumferential peripheral, edge surface.

3. A method of manufacturing a capsule comprising, forming two substantially identical shells each having a mouth and a radially extending flange circumferentially of the mouth thereof, said shells and the flanges thereof being dimensioned to have the flanges disposed overlying each other with said shells defining an enclosure upon assembly into a capsule, removing a circumferential marginal portion of the flange of one of the shells, partially punching a circumferential marginal portion of the flange of the other of the shells without completely punching therethrough thereby forming an upstanding rim circumferentially of the flange of said other of said shells in position for closely, circumferentially enclosing the flange on said one of the shells to preclude relative radial movement between said shells upon assembly of said shells, disposing the shells in assembled condition defining an enclosure and with the flanges juxtapositioned with said rim circumferentially of the flange of said other flange accurately releasably holding said other flange in a radial relative position without jigs and fixtures, and securing said flanges to each other to secure the shells in fixed assembly, and securing said flanges comprising depositing a weld on said rim joining it to the flange of said flange of said other shell hermetically sealing said enclosure.

4. A method of manufacturing a capsule according to claim 3, in which securing said flanges comprises depositing a weld on said rim joining it to the flange of said flange of said other shell hermetically sealing said enclosure.

References Cited

UNITED STATES PATENTS

| 2,089,749 | 8/1937 | Jardine. | |
| 2,171,972 | 9/1939 | Debor | 220—3 |
| 2,263,021 | 11/1941 | Uecker. | |
| 2,553,885 | 5/1951 | Van Orman | 220—56 X |

GEORGE E. LOWRANCE, Primary Examiner

U.S. Cl. X.R.

29—463; 220—5